United States Patent [19]
Burgess et al.

[11] 3,974,752
[45] Aug. 17, 1976

[54] PRESSURE CONTROL SYSTEM

[75] Inventors: Glenn A. Burgess, Downey; Paul J. Taylor, Torrance, both of Calif.

[73] Assignee: The Garrett Corporation, Los Angeles, Calif.

[22] Filed: Nov. 25, 1974

[21] Appl. No.: 526,669

[52] U.S. Cl. .................................. 98/1.5; 137/81
[51] Int. Cl.² ..................................... B64D 13/00
[58] Field of Search ........... 98/1.5; 165/15; 244/59; 137/608, 81; 236/49

[56] References Cited
UNITED STATES PATENTS

| | | | |
|---|---|---|---|
| 2,513,332 | 7/1950 | Kemper | 98/1.5 |
| 2,556,159 | 6/1951 | Arthur | 98/1.5 |
| 2,669,175 | 2/1954 | Fischer | 98/1.5 |
| 2,873,661 | 2/1959 | Fischer | 137/81 |
| 2,900,890 | 8/1959 | Fischer et al. | 98/1.5 |
| 3,376,802 | 4/1968 | Emmons | 98/1.5 |
| 3,650,197 | 3/1972 | Voronin et al. | 98/1.5 |

*Primary Examiner*—John J. Camby
*Assistant Examiner*—Henry C. Yuen
*Attorney, Agent, or Firm*—Orville R. Seidner; Joel D. Talcott; Albert J. Miller

[57] ABSTRACT

A cabin pressure control system for an aircraft in which the controller provides control signals to an outflow valve by way of a pneumatic amplifier relay means, has the memory or rate chamber of the controller providing the pneumatic signal to the relay instead of the usual case where the signal comes from the reference pressure chamber. Any one of several forms of relays may be used in this novel system. One form of relay includes a feedback signal from the outflow valve.

29 Claims, 5 Drawing Figures

PRESSURE CONTROL SYSTEM

BACKGROUND OF THE INVENTION

1. Field of the invention

This invention pertains generally to pressurized compartments and is more particularly concerned with cabin pressure control systems for pressurized passenger aircraft cabins.

2. Description of the prior art

Over the years there has been a steady improvement in performance of cabin pressure control systems for the larger commercial aircraft. With design perfection many problems have been eliminated and other problems have been reduced significantly. Accordingly it was inevitable, in considering the overall advantages of aircraft flight at greater altitudes, that the manufacturers of the smaller private and so-called executive class of aircraft would establish a trend to the pressurization of their aircraft cabins.

Known cabin pressure control systems have not proven to be satisfactory since they are too elaborate and expensive for such reduced requirements. Also, mere scaling down in size has been found to be an unsatisfactory procedure, probably because it is not possible to scale down the important element of time as well as that of dimensions. For example, the time lag between the instant of sensing a pressure change and a later time when the system correction has been made may be a very critical factor in aircraft passenger comfort. In the larger aircraft where large space volumes are to be contended with, the time lag can be longer than in the case of a smaller space volume. That is, where the space volume is large, transient pressure excursions due to inflow transients or changes in atmosphere pressure tend to smooth out, and passenger discomfort is at a minimum.

However, in the smaller aircraft it has been found that the mere act of preparing to take off, for example, together with the takeoff run and the subsequent operation of landing gear retraction after the wheels leave the ground, can subject the passengers to the severe discomfort of an annoying cabin "bump." For example, in a laboratory test to simulate the takeoff of a Cessna 500 aircraft from a simulated field altitude 2,250 ft., with the aircraft having a current cabin pressure control system, it was demonstrated that the cabin received a positive pressure "bump" equivalent to 310 ft. in altitude within about 10 seconds after start of takeoff, and then receded in pressure altitude to a "negative" bump of about 332 ft. from that artificial altitude in the next seven seconds. It will be noted that the negative bump was much more severe in rate of change of altitude than was the positive bump.

In order to overcome to some extent the effects of such system operation it has been necessary for the crew of the aircraft to carefully ascertain and select the field altitude on the cabin pressure controller prior to take-off, and then to reselect the cruise cabin altitude following lift-off. This, of course, contributes to crew work load at a critical time without assurance that a random pressure transient won't negate the initial setting. The requirements for reselection of cabin cruise altitude means further that another cabin pressure transient is experienced at that time.

The cabin pressure regulating system currently in use, as noted above, does not include a pneumatic relay in its operation, although other systems do employ such a component to provide amplification and stabilization of outflow valve drive. Consequently, in attacking the problems as aforesaid it was considered that a starting point for their solution might be to add such a relay. In the course of such routine engineering study of the design problem, the inspiration was had to change the control pressure signal for the relay from the usual location in communication with the referenced chamber pressure of the controller to the memory or rate chamber pressure. The system gain provided by the relay permits relocation of control to memory. This was done and the discovery was made that unusual improvements resulted as follows:

a. Cabin transients as a result of the reselection of cabin altitudes in flight are eliminated.

b. The system error as a function of aircraft pressure differential and cabin inflow level is reduced by approximately 50 percent. This improves the selectability of the system.

c. The system dynamic response to cabin inflow variations has also been improved by approximately 50 percent. This reduces cabin pressure excursions due to cabin inflow or outflow variations caused by other equipment.

SUMMARY OF THE INVENTION

Accordingly the present invention has for its principal object the improvement of pressure control systems for pressurized compartments such as aircraft cabins, in particular the cabin pressure control systems for the cabin compartments of significantly lesser volume than has heretofore been the object of the attention of design engineers. A further object is to provide a cabin pressure control system utilizing known system components coupled in an unique manner to improve significantly the dynamic response to inflow variations together with a significant reduction of system error as a function of aircraft pressure differential and cabin inflow level, and to further eliminate or reduce to insignificance cabin transients resulting from cabin altitude reselection.

To the end of accomplishing the foregoing objects, the invention is addressed to problem solution by (a) providing a system with known controller and outflow valve configurations coupled by pneumatic relay means (which may take the form of any one of several configurations), in which (b) the pressure signal for the relay is uniquely taken from the memory or rate chamber of the controller rather than from the reference pressure chamber as is current practice.

Other and further objects will be apparent at once to those skilled in the art upon consideration of the drawings when considered in connection with the description thereof hereinbelow.

DESCRIPTION OF THE PREFERRED EMBODIMENTS

Figure 1:
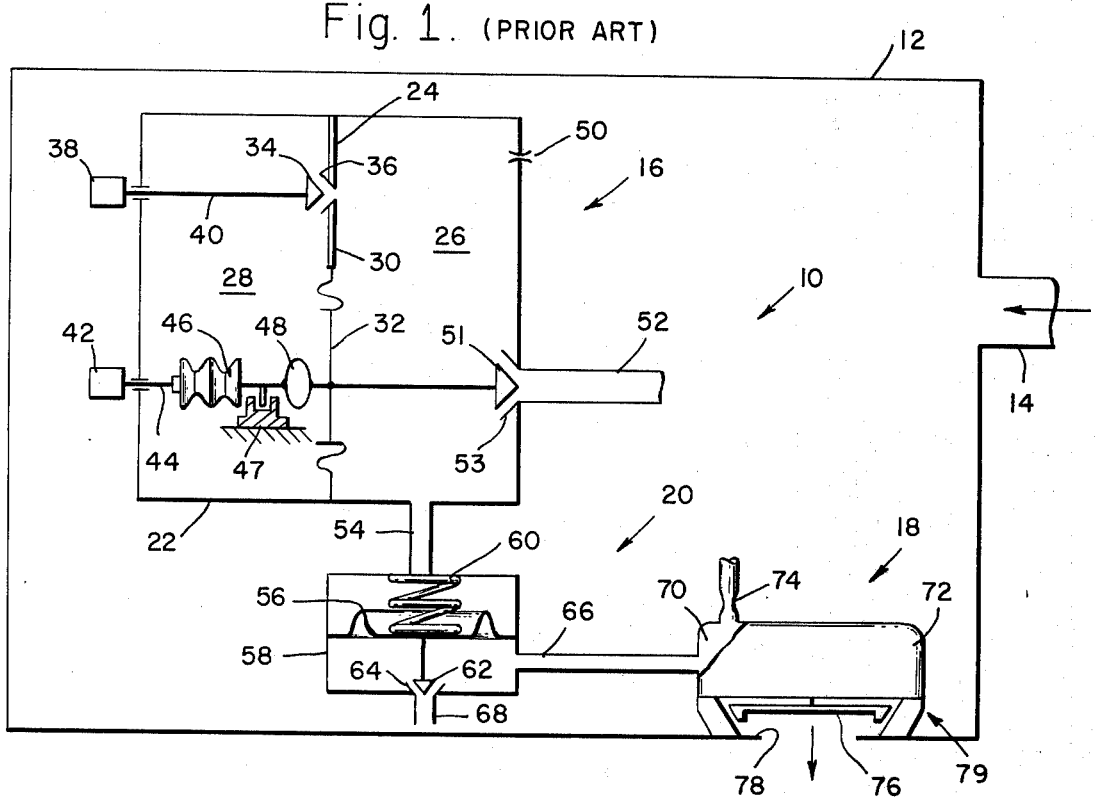
FIG. 1 is a schematic illustration of a cabin pressure control system according to the prior art.

Referring to FIG. 1 there is depicted schematically a prior art pressure control system 10 arranged to control the pressure in a compartment such as a cabin 12 in an aircraft (not shown). The compartment 12 is supplied with pressurized air from a source (not shown) through the inflow duct 14.

The control system 10 comprises a pressure signal controller means 16, and an outflow valve means 18 with signal amplifying means such as a pneumatic relay means 20 disposed in the control circuit between the controller 16 and the valve 18. The controller 16 comprises a housing 22 having an internal wall 24 dividing the housing into two chambers 26 and 28. The wall 24 is comprised in part of a fixed portion 30 and a movable wall diaphragm portion 32 subject to the differential of pressures in the chambers 26 and 28.

The chamber 26 will be referred to hereinafter as the reference pressure chamber and the chamber 28 as the rate or memory chamber. Communication between the chambers 26 and 28 is provided by a variable orifice defined by an adjustable valve 34 and its seat 36, the valve 34 being adjustably movable by a knob 38 disposed on the exterior end of a rod 40 whose other end extends into the chamber 28 with the valve 34 affixed thereon.

An adjustment knob 42 is disposed on one end of a rod 44 with one end of an evacuated bellows 46 in the chamber 28 affixed on the other end. Both of the rods 40 and 44 are threadably disposed in the wall of the housing 22 to provide axial-wise adjustment of the valve 34 and the bellows 46. The other end of the bellows 46 is coupled through a light rate spring 48 to the diaphragm 32. A limit stop 47 is provided to limit the movement of the rod 44.

The controller chamber 26 is coupled through a bleed orifice 50 to a fluid source at a pressure greater than would normally exist in the chamber 26, and is also coupled to a sink source duct 52 from a sink (not shown) at a pressure less than would normally exist in the chamber 26. Controlled bleed from the chamber 26 to the duct 52 is provided by a metering valve 51 coupled to the diaphragm 32 and cooperatively disposed relative to the valve seat 53. The higher pressure source coupled through the bleed orifice 50 may conveniently be that of the compartment 12, and the lower pressure sink source may be that of a vacuum source such as that provided for certain instruments of the aircraft.

Fluid pressure signals for the control of the outflow valve means 18 are provided by the controller 16 from the reference pressure chamber 26 through a signal pressure conduit 54 to one face of a diaphragm 56 in the relay housing 58. A light spring 60, which may be adjustable, tends to urge the diaphragm 56 in a direction to move the metering valve 62 against its seat 64 in aid of the force of the control pressure from conduit 54 on the diaphragm 56. Opposing the force of the control pressure signal and the spring 60 on the diaphragm 56 is the pressure from a conduit 66 admitted on the opposite face of the diaphragm 56.

The conduit 66 communicates pressure from a chamber 70 defined in part by the walls of a housing 72 forming a part of the valve means 18. This pressure is controlled by the positioning of metering valve 62 which regulates the flow from chamber 70 through conduit 66 to sink source duct 68. Conveniently, the sink source from the duct 68 is the same source as that of the sink source from the ducts 52. The chamber 70 is coupled through a bleed orifice 74 to a fluid source at a pressure higher than normally subsists in the chamber 70, conveniently the pressure in the cabin 12. The pressure in the chamber 70 is manifest against one face of a movable wall means (not shown) coupled to a poppet valve 76 arranged to control the flow of compartment air from the cabin 12 through an outflow opening 78 as indicated by the arrows 79. It should be noted that the pneumatic relay 20 is not always required in the compartment pressure control system. However, where pneumatic signal strength from the controller requires amplification and it is desirable to stabilize the outflow valve drive, then a relay such as that shown at 20 fulfills the required conditions.

As noted, though, a basic control system would comprise the controller 16 and the outflow valve means 18, as previously disclosed in U.S. Pat. No. 2,669,175 issued to Richard A. Fischer on Feb. 16, 1954, and assigned to the assignee of the present invention. In that prior patent there is disclosed a cabin pressure control comprising a pressure setting mechanism 35 arranged to provide pressure signals to an outflow valve 14. The elements of the mechanism 35 of that patent, and their arrangement and function, are very nearly identically similar to the elements of the controller 16 described hereinabove; and, likewise as to the similarity of the outflow valve 14 of the patent of the valve means 18 herein.

Thus, the patented mechanism 35 has a housing 36 divided into a first chamber 38 to provide the control point setting pressure (corresponding to the reference pressure chamber 26 herein) and a second backup chamber 37 (which corresponds with the rate or memory chamber 28 herein). It will be noted that the control pressure signals of the patented mechanism 35 are communicated from its control chamber 38 to the outflow valve 14, substantially as disclosed herein on FIG. 1, albeit directly rather than through a relay.

Where the invention of the present disclosure differs from that of the prior art is in the coupling of the outflow valve to the rate or memory chamber instead of to the reference pressure chamber, as will now be described with reference to FIG. 2.

Figure 2:
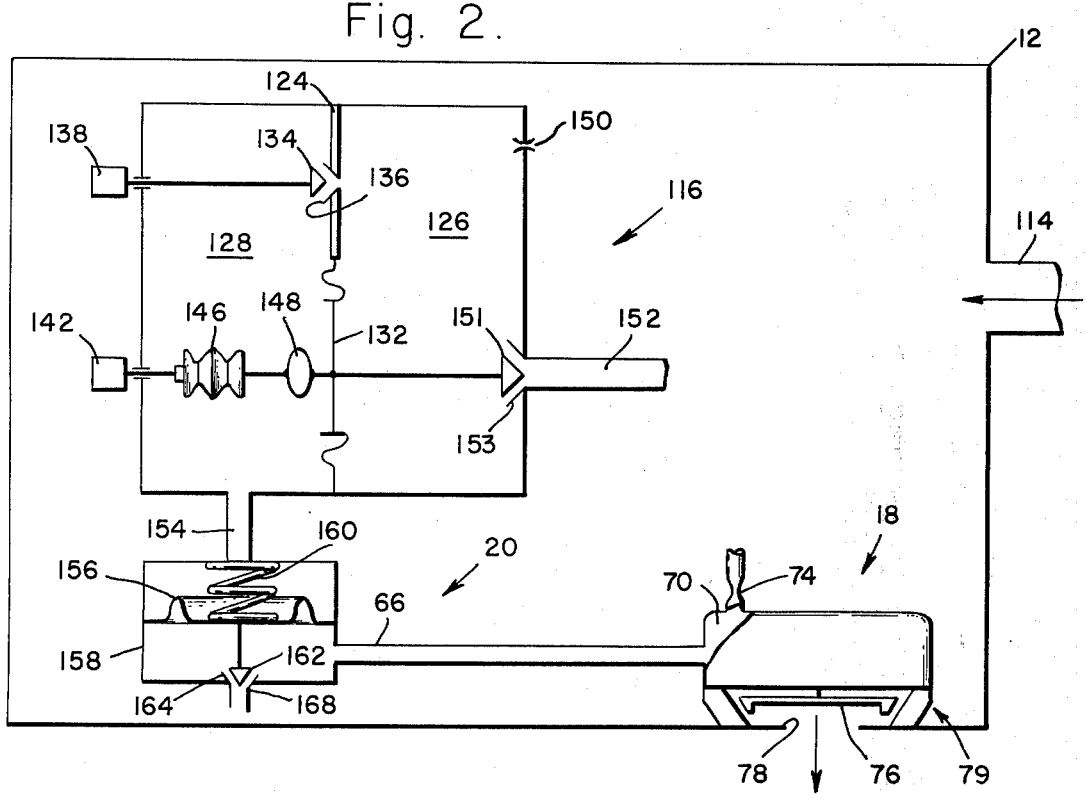
FIG. 2 is a similar illustration depicting the system according to the invention.

On FIG. 2, the elements and components of the controller 116, and those of the outflow valve means 18 and the pneumatic relay 20 are identical with the elements and components of the controller 16, valve means 18, and relay 20 of FIG. 1. As noted, the only difference is in the arrangement wherein the relay 20 of FIG. 2 communicates with the rate or memory chamber 128 of the controller 116 through the signal pressure conduit 154, instead of communicating with the reference pressure chamber 126. With this unique arrangement it has been discovered the system exhibits greatly increased stability with a remarkable reduction of the transients heretofore occurring when the cabin pressure controls were reset for a reselection of cabin altitude setting. It is believed that this unusual advance in the art is brought about by the additional lag introduced when the control signals are provided from the rate chamber which communicates with the reference chamber only past the rate valve 134 and its seat 136.

Figure 3:
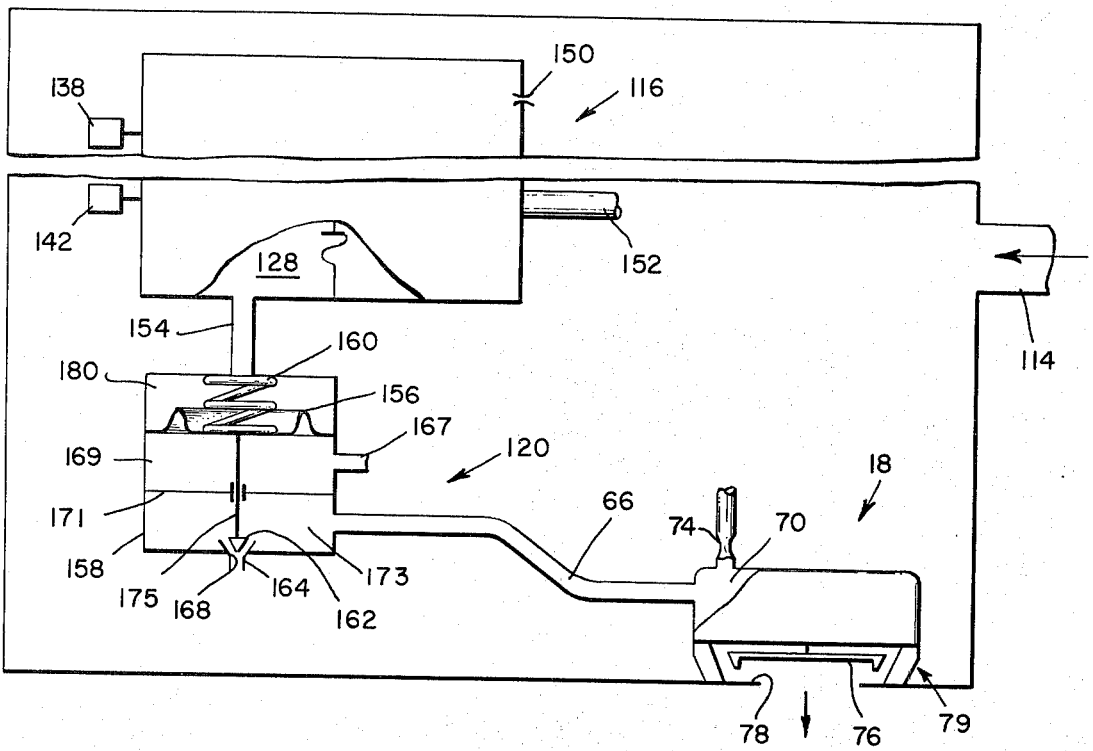
FIG. 3 is a schematic illustration of an alternative form of pneumatic relay which may be used to practice the invention.

In order to still further improve the operation of the system of FIG. 2, the relay 20 thereof is replaced by the relay 120 as shown on FIG. 3. On that figure the relay 120 comprises a housing 158 providing communication for pressure signals from the rate or memory chamber 128 of the controller 116 through the signal pressure conduit 154 to one face of a diaphragm 156 defining a chamber 180 in the housing 158. The opposite face of the diaphragm 156 is subject to pressure from the pressurized compartment via the conduit 167 applied to a chamber 169. A light spring 160 may urge the diaphragm 156 towards chamber 169. A wall 171 separates chamber 169 from a chamber 173 and provides a dynamic seal for the axial movement therethrough of the valve actuator rod 175 coupled between the diaphragm 156 and the metering valve 162 which is cooperatively disposed on its seat 164 to control the communication through the conduit 66 between the valve housing chamber 70 and the sink pressure source conduit 168. This arrangement of the relay 120 with the controller 116 provides a system having a high response to flow transients.

Figure 4:
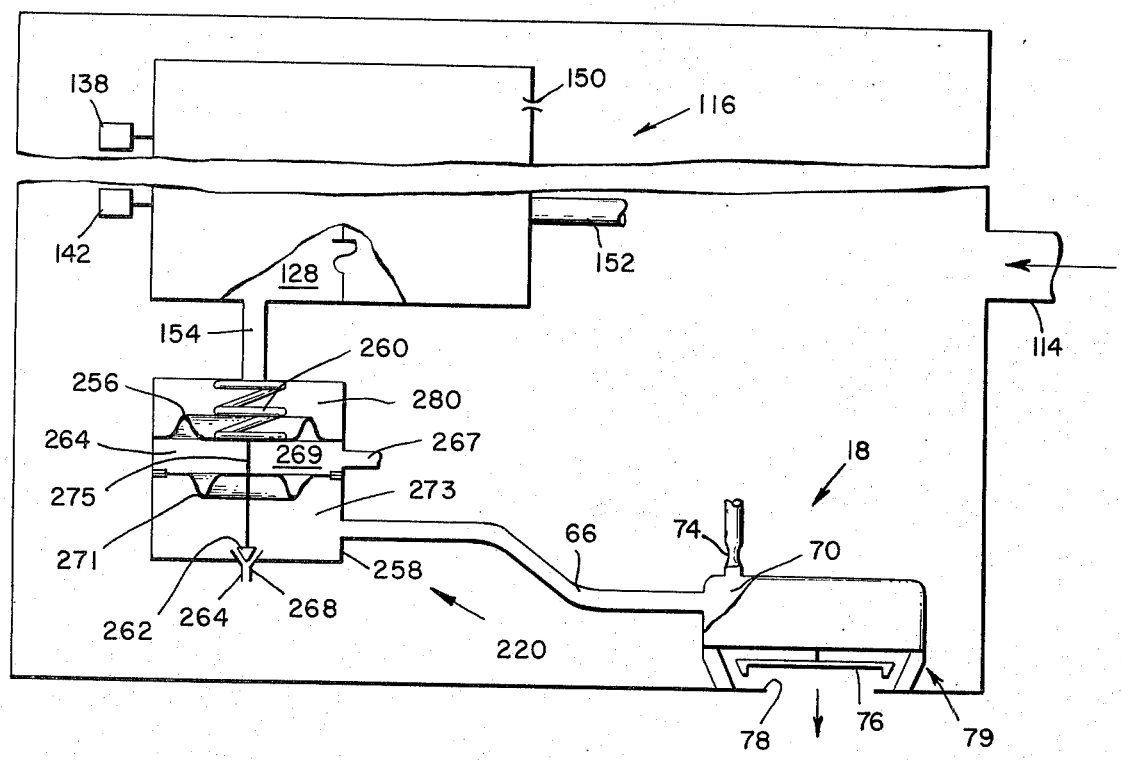
FIG. 4 is a schematic illustration of yet another form of relay which may be used.

In the event the system according to FIG. 3 has a tendency to exhibit an undesirable level of instability, the system can take the form depicted on FIG. 4, wherein a different form of relay 220 is coupled in the pressure signal route between the memory chamber 128 of the controller 116 and the control chamber 70 of the outflow valve means 18. The relay 220 has a housing 258 defining with the enclosed diaphragms 256 and 271; the three chambers 269, 273 and 280. As was the case in connection with FIG. 3, conduit 154 provides communication from the rate or memory chamber 128 of the controller 116 to one face of the diaphragm 256 whose opposite face is subject to the compartment pressure manifest in the chamber 269 by way of the conduit 267. This compartment pressure is also manifest on the facing surface of the diaphragm 271 which has approximately one quarter of the surface area of diaphragm 256 which is biased towards chamber 269 by light spring 260. The other face of the diaphragm 271 is subject to the pressure in the chamber 273 which communicates through the conduit 66 with the housing chamber 70 in the valve means 18.

Both of the diaphragms 256 and 271 are coupled by means of a rod 275 to the metering valve 262 which cooperates with the valve seat 264 to control communication between the chamber 273 and the sink source conduit 268 of the lower pressure source. With this arrangement the relay is provided with a lead function in the form of a feedback from the outflow valve means which it is driving. The net result of the arrangement is that compartment pressure over the smaller diaphragm area (i.e., the area of the diaphragm 271), is cancelled out and a rate or memory chamber pressure to relay signal pressure force results acting on the small diaphragm area. Thus, direct feedback of the valve drive (i.e., the relay output) signal is referenced to rate or memory to limit the extremely fast response due to the cabin-to-memory chamber differential pressure across the larger diaphragm.

Figure 5:
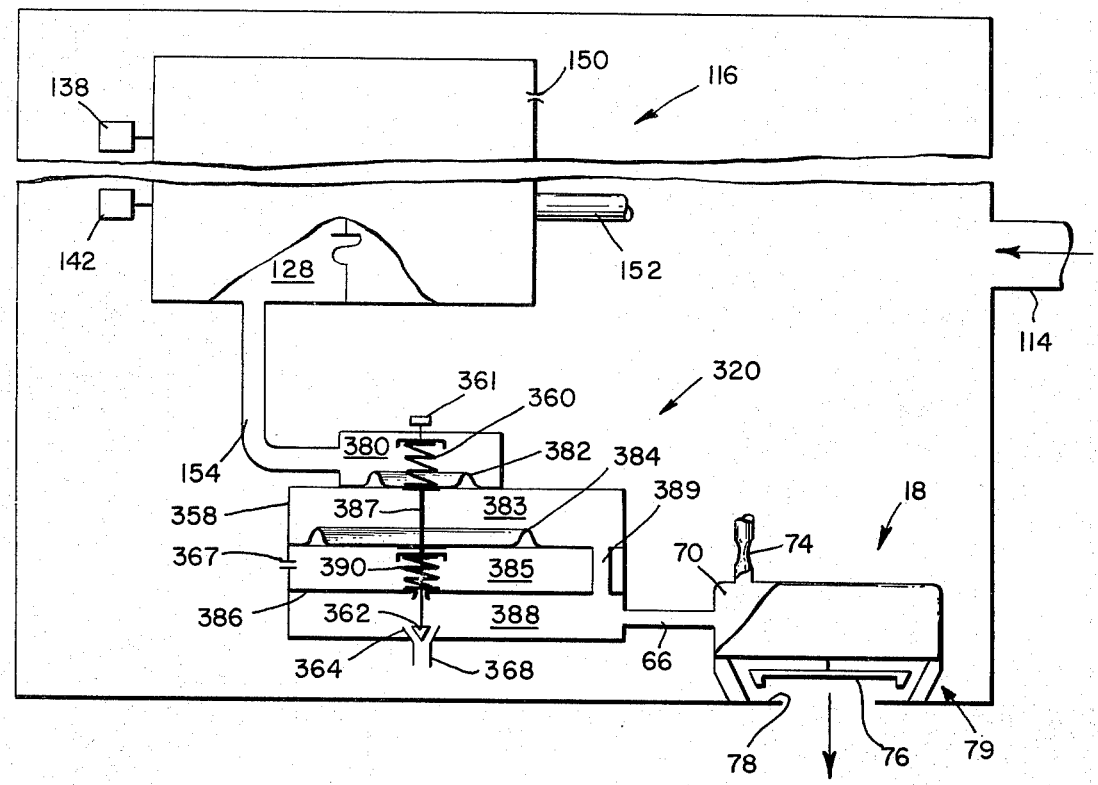
FIG. 5 is a schematic illustration of still another form of relay which may be used.

In order to increase the gain of the system while still maintaining a high degree of stability, the alternate form of relay illustrated in FIG. 5 may be utilized. In this form, the relay 320 is again coupled in the pressure signal route between the memory chamber 128 of the controller 116 and the control chamber 70 of the outflow valve means 18. The relay 320 includes housing 358 divided into chamber 380 383, 385, and 388 by diaphragms 382 and 384 and wall 386.

Diaphragm 382 is subjected on one face to the pressure signals from the rate or memory chamber 128 of the controller 116 through the signal pressure conduit 154 communicating with chamber 380. A light spring 360, adjustable by knob 361, may bias the diaphragm 382 towards chamber 383. Chambers 383 and 388 communicate through opening 389 such that both chambers contain the same pressure as the outflow valve chamber 70 which communicates to chamber 388 through conduit 66. Thus the opposed face of diaphragm 382 and the face of diaphragm 384 defining chamber 383 are exposed to chamber pressure 70. Diaphragm 382, which is coupled to diaphragm 384 by means of rod 387, has approximately one quarter of the surface area of diaphragm 384.

Metering valve 362 co-operates with vale seat 364 to control communication between the chamber 388 and the sink source conduit 368. The metering valve 362 is biased away from wall 386 by light spring 390.

Pressure in chamber 380 is established by controller 116. During steady state operation pressures 380, 383 and 388 are balanced against spring forces 360, 390 and diaphragm areas 382 and 384 and cabin pressure 385 acting on diaphragm 384 to control the outflow valve head pressure 70 to a fixed offset from the control pressure 380.

With any increase in cabin pressure, which may occur with increased cabin air in-flow, the increase in cabin pressure enters chamber 385 through inlet port 367 and is felt by diaphragm 384. The increased pressure difference working across diaphragm 384 generates a force which overcomes the 360 spring force and moves to allow metering valve 362 to open. The movement of metering valve 362 to a more open position reduces chamber pressure 388 and the valve head pressure 70 through conduit 66 which opens the outflow valve 18. Simultaneous with the reduction in chamber pressure 388, a decrease in pressure 383 occurs through passage 389. This reduction in pressure is felt by both diaphragms 382 and 384. The effect on diaphragm 384 is to further increase the force overcoming the 360 spring force. The effect on diaphragm 382, however, is to generate a force which assists spring 360 and partly negates the diaphragm 384 force. The result of all of the previous actions and interactions provides a fast responding outflow valve with rapid increases in cabin pressure while being compensated sufficiently to obtain pressure control stability. The device also works in a comparable manner for decreasing cabin pressures which may be created by a decrease in cabin in-flow.

While specific embodiments of the invention have been illustrated and described, it is to be understood that these are provided by way of example only and that the invention is not to be construed as being limited thereto, but only by the proper scope of the following claims.

What is claimed is:

1. Control apparatus for a fluid pressurized compartment provided with fluid inlet and outlet means in which the outlet means includes an outflow valve means having a chamber controlling the flow of fluid from the pressurized compartment in response to fluid pressure manifested in the chamber in the outflow valve means, said control apparatus comprising:
   a. control housing means;
   b. means providing first and second chambers in said housing means;
   c. means defining a restricted passageway between said chambers;

d. fluid source means coupled to one of said housing chambers; and e. pneumatic signal conduction means coupled between the other of said housing chambers and the chamber in the outflow valve means.

2. The apparatus of claim 1 in which said pneumatic signal conduction means comprises a pneumatic relay.

3. The apparatus of claim 2 in which said fluid source means comprises first and second fluid sources at pressures differing from that in one of said housing chambers.

4. The apparatus of claim 3 in which one of said fluid sources is at a pressure higher than that of said one of said housing chambers and the other of said fluid sources is at a pressure lower than that of said one of said housing chambers.

5. The apparatus of claim 4 in which one of said fluid sources communicates with said one of said housing chambers through a fixed restricted bleed orifice and the other of said fluid sources communicates with said one of said housing chambers through a variable valve means.

6. The apparatus of claim 5 in which one of said fluid sources is at a pressure higher than that in said one of said housing chambers and said other of said fluid sources is at a pressure lower than that in said one of said housing chambers.

7. The apparatus of claim 6 in which said variable valve means is coupled to means responsive to the differential of pressures in said housing chambers.

8. The apparatus of claim 7 in which said restricted passageway means comprises adjustable valve means arranged to control fluid flow between said housing chambers.

9. The apparatus of claim 2 in which said pneumatic relay means comprises metering valve means coupled between the chamber of the outflow valve means and a source of fluid at a pressure differing from that in said chamber to control the fluid flow therebetween.

10. The apparatus of claim 9 in which said pneumatic relay means further comprises movable wall means having a metering valve movable wall operably coupled to said metering valve means, said metering valve movable wall having one surface subject to the pressure in said other of said housing chambers.

11. The apparatus of claim 10 in which another surface of said metering valve movable wall is subject to the pressure in said outflow valve chamber.

12. The apparatus of claim 10 in which another surface of said metering valve movable wall is subject to the pressure in the fluid pressurized compartment.

13. The apparatus of claim 12 in which said movable wall means still further comprises an opposition movable wall subject to the pressure in the fluid pressurized compartment and arranged to apply an opposing force to said metering valve means in opposition to the force applied thereto by said metering valve movable wall to provide a lead function in the form of a feedback from said outflow valve means.

14. The apparatus of claim 13 wherein the surface area of said metering valve movable wall is approximately four times the surface area of said opposition movable wall.

15. The apparatus of claim 11 in which said movable wall means still further comprises an opposition movable wall subject to the pressure of the fluid pressurized compartment and arranged to apply an opposing force to said metering valve means in opposition to the force applied thereto by said metering valve movable wall.

16. The apparatus of claim 15 wherein the surface area of said metering valve movable wall is approximately one quarter the surface area of said opposition movable wall.

17. The method of controlling the pressure in a fluid pressurized compartment having inlet and outlet passageway means for the supply and exhaust of fluid to and from said compartment by means of throughflow valve means disposed in one of said passageway means, and having a control means for adjusting said valve means to maintain a pressure schedule in said compartment, comprising:

a. establishing first and second chambers in said control means with a restricted fluid flow passageway means therebetween;

b. coupling sources of fluid to said second chamber with one of said sources at a higher pressure and another of said sources at a lower pressure than that of the fluid in said chamber;

c. establishing a head chamber in said flow valve means having movable wall means adapted to move said valve means between fully open and fully closed positions to regulate the flow of fluid into and out of said compartment;

d. disposing fluid conduit means between said first chamber and said head chamber; and e. disposing a pneumatic signal means in said conduit means to act on fluid pressure signals from said first chamber of said control means and to provide amplified fluid pressure signals to said head chamber.

18. The method of claim 17 further comprising disposing a pneumatic relay in said pneumatic signals means.

19. The method of claim 17 further comprising providing said passageway means between said first and second chambers in said control means with adjustable valve means to adjust the restriction of fluid flow through said passageway means.

20. The method of claim 19 further comprising providing said second chamber with a fixed restricted bleed orifice means and an adjustable orifice means to control the flow of fluid between said second chamber and said higher pressure and lower pressure sources.

21. The method of claim 20 in which said higher pressure source is coupled to said second chamber through said fixed bleed orifice and said lower pressure source is coupled to said second chamber through said adjustable orifice means.

22. The method of claim 20 further comprising providing a movable wall means subject to the pressures in said first and second chambers and further providing adjustment of the flow of fluid through said adjustable orifice means in accordance with the positions of said movable wall means.

23. The method of claim 17 further comprising providing said relay means with a metering valve coupled with a movable wall and having one surface thereof subject to the fluid pressure signal from said second chamber and another surface thereof subject to the pressure in said head chamber, said metering valve being arranged to modulate the pressure in said head chamber.

24. The method of claim 17 further comprising providing said relay means with a metering valve coupled with a movable wall having one surface thereof subject to the fluid pressure signal from said second chamber and another surface thereof subject to the pressure in the fluid pressurized compartment, said metering valve being arranged to modulate the pressure in said head chamber.

25. The method of claim 24 further comprising providing said relay means with an opposition movable wall subject to the pressure in the fluid pressurized compartment and arranging said opposition movable wall to act in opposition in part to the action of said metering valve movable wall to provide a lead function in the form of a feedback from said flow valve means.

26. The method of claim 23 further comprising providing said relay means with an opposition movable wall subject to the pressure in the fluid pressurized compartment and arranging said opposition movable wall to act in opposition in part to the action of said metering valve movable wall.

27. Control apparatus for a fluid pressurized compartment provided with fluid inlet and outlet means in which the outlet means includes an outflow valve means having a chamber controlling the flow of fluid from the pressurized compartment in response to fluid pressure manifested in the chamber in the outflow valve means, control housing means having first and second chambers, and a pneumatic relay coupled between the control housing means and the chamber in the outflow valve means, said pneumatic relay comprising metering valve means coupled between the chamber of the outflow valve means and a source of fluid at a pressure differing from that in said chamber to control the fluid flow therebetween, movable wall means in said relay having a metering valve movable wall operably coupled to said metering valve means, said metering valve movable wall having one surface subject to the pressure in one of said control housing chambers, another surface of said metering valve movable wall being subject to the pressure in said outflow valve chamber.

28. Apparatus of claim 27 in which said movable wall means further comprises an opposition movable wall in said relay operably coupled to said metering valve movable wall and subject to the pressure of the fluid pressurized compartment and arranged to apply an opposing force to said metering valve means in opposition to the force supplied thereto by said metering valve movable wall.

29. The apparatus of claim 28 wherein the surface area of said metering valve movable wall is approximately one-fourth the surface area of said opposition movable wall.

* * * * *